United States Patent
Abe et al.

[11] 3,995,948
[45] Dec. 7, 1976

[54] PHASE MASK FOR USE IN HOLOGRAPHIC APPARATUS

[75] Inventors: Michiharu Abe; Akiyoshi Oride; Fusakichi Okouchi, all of Tokyo, Japan

[73] Assignee: Ricoh Co., Ltd., Tokyo, Japan

[22] Filed: Apr. 28, 1975

[21] Appl. No.: 572,282

[30] Foreign Application Priority Data

May 1, 1974 Japan .............. 49-48318

[52] U.S. Cl. .................. 350/3.5; 350/314; 427/165; 426/240; 428/141
[51] Int. Cl.² ............... G03H 1/16; G02B 5/02
[58] Field of Search ........... 350/3.5, 314; 428/141, 428/172; 427/165, 162, 164, 240

[56] References Cited
UNITED STATES PATENTS

| | | | |
|---|---|---|---|
| 3,212,920 | 10/1965 | Chapman | 427/165 |
| 3,604,778 | 9/1971 | Burckhardt | 350/3.5 |
| 3,829,193 | 8/1974 | Tsunoda et al. | 350/3.5 |
| 3,839,067 | 10/1974 | Sosnowski et al. | 427/164 |

*Primary Examiner*—Ronald J. Stern
*Attorney, Agent, or Firm*—Woodhams, Blanchard and Flynn

[57] ABSTRACT

A phase mask for use in a holographic apparatus comprising a combination of phase mask and data mask and being so devised that an illuminant beam transmitting these masks is irradiated on a Fourier transform plane together with a reference beam coherent with said illuminant bean, said phase mask being composed of a transparent plate and random undulations formed on the surface of said transparent plate by coating a solution of high molecular weight compound by means of a spin coater.

12 Claims, 8 Drawing Figures

3,995,948

PHASE MASK FOR USE IN HOLOGRAPHIC APPARATUS

BACKGROUND OF THE INVENTION

The present invention relates to a phase mask, and particularly relates to a phase mask for use in a holographic apparatus for recording a high-density image information for a Fourier transform hologram.

There have hitherto been proposed a variety of practical holographic apparatuses which generally utilize various properties of hologram such as high storage density and redundancy of memory, self-focalizability of reconstructed image, etc. However, all of these conventional holographic apparatuses have been defective in that, because of the noise arising from a flaw or dust in the optical system attributable to the spatial and temporal coherence of the laser beam used, the coherent noise represented by the speckle noise arising from the diffusing surface, and the non-linear record noise arising from non-linear recording on a hologram recording material, the resulting image has a great defect in quality which has been a major obstacle to the practical use of the holographic apparatus.

Under such circumstances, various attempts have so far been made with a view to eliminating the noise and improving the quality of image. To cite an instance, it has been proposed to apply the method of superposing a random phase mask upon a two-dimensional transparent object at the time of photographing a Fourier transform hologram of a two-dimensional transparent object as the data mask.

By the way, there are known various types of random phase masks of this kind. All of these conventional random phase masks are fabricated through a process in which a mask with a random pattern is first prepared according to the random function generated by a computer, and next a transparent dielectric substance like zinc sulfide (ZnS), cerium oxide ($CeO_2$), etc., is deposited in a few or several steps through vacuum evaporation on an optical glass plate through this mask. The preparation of the conventional random phase masks is very difficult technically and is apt to be costly. Besides, these phase masks have various drawbacks such that the thickness of the transparent dielectric substance for use in the phase mask must be changed according to the wavelength of the laser beam to be applied, and therefore, the resulting phase mask is insufficient in function for use in recording a color image. Moreover, it is insufficient in randomness, so that there occurs the localization of luminant beams from the object on the Fourier transform plane or the generation of Moire effect ascribable to the sampling mesh used jointly with the phase mask.

SUMMARY OF THE INVENTION

The principal object of the present invention is to provide a phase mask which renders it possible to eliminate the drawbacks in the prior art as discussed above.

Another object of the present invention is to provide a phase mask having a surface with random undulations formed by coating a solution of high molecular weight compound like thermoplastic resin on a transparent plate like glass plate, whereby rendering it possible to fabricate a phase mask very easily and economically, to change freely the light intensity distribution on a Fourier transform plane, to fabricate easily an optimum phase mask in conformity with the hologram recording area and the characteristics of the hologram recording material, to facilitate the induction of a Fourier transform hologram in the dynamic range of hologram recording material, to prevent the lowering of the recording density and the increase of the speckle noise of reconstructed image and so forth ascribable to broad distribution on the Fourier transform plane like in the case of employing a common diffuser such as a frosted glass, to maintain a high-density recording property, and to minimize the coherent noise of the reconstructed image of hologram without impairing the prolixity of hologram.

DETAILED DESCRIPTION OF THE INVENTION

Figure 1:
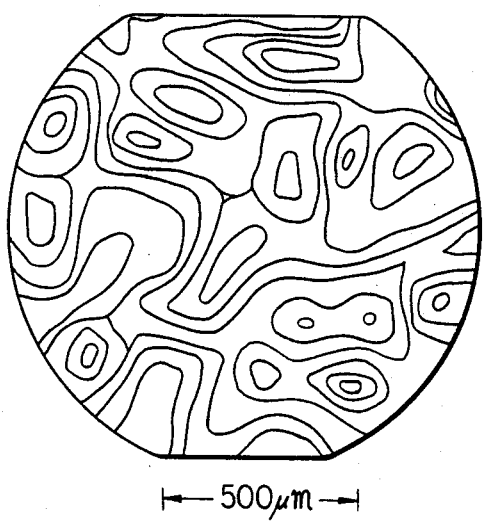
FIG. 1 is a replica of a microphotograph of the interference pattern of the surface of a phase mask according to the present invention, wherein the continuous curved line represents a contour line, and the distance between the contour lines is 0.33 $\mu$m.

A phase mask according to the present invention is prepared by forming random undulation on the surface of a transparent plate like a glass plate (not shown in the drawings) by coating thereon a solution prepared by dissolving a high molecular weight compound. Surface deformation or random surface waves or undulations are caused on the surface of said plate with said coating in a state of solution, by means of a spinner coater (not shown in the drawings) as prevalently employed in preparing a photomask for IC or the like. The surface undulations are fixed by drying.

The high molecular weight compound and the solvent therefor for use in the fabrication of the present phase mask are exemplifed in the following Table 1.

Table-1

Figure 5:
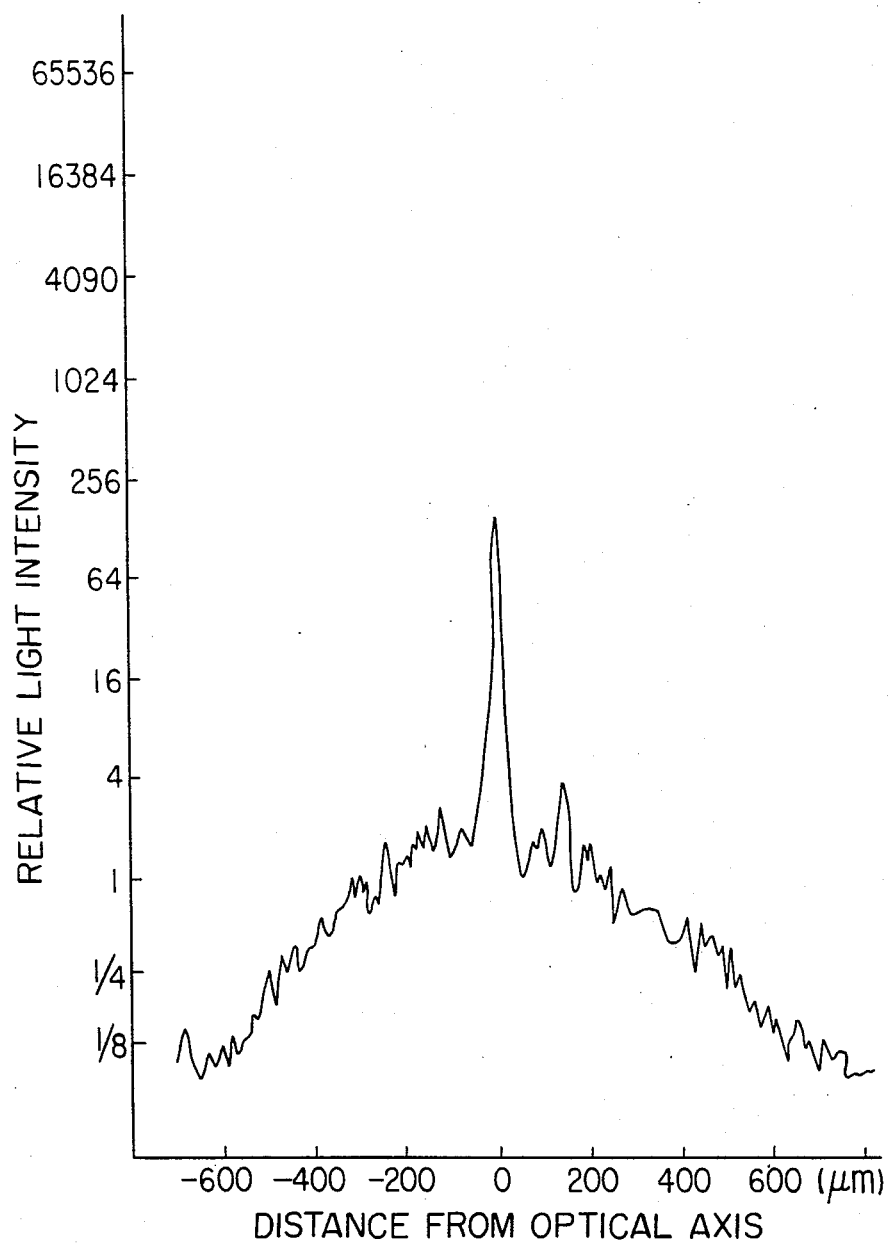
FIG. 5 is a graph illustrative of the state of distribution of light intensity on a Fourier transform plane in the case where any two-dimensional transparent object is not disposed and only a phase mask according to the present invention is disposed in the holographic apparatus shown in FIG. 3.
Figure 6:
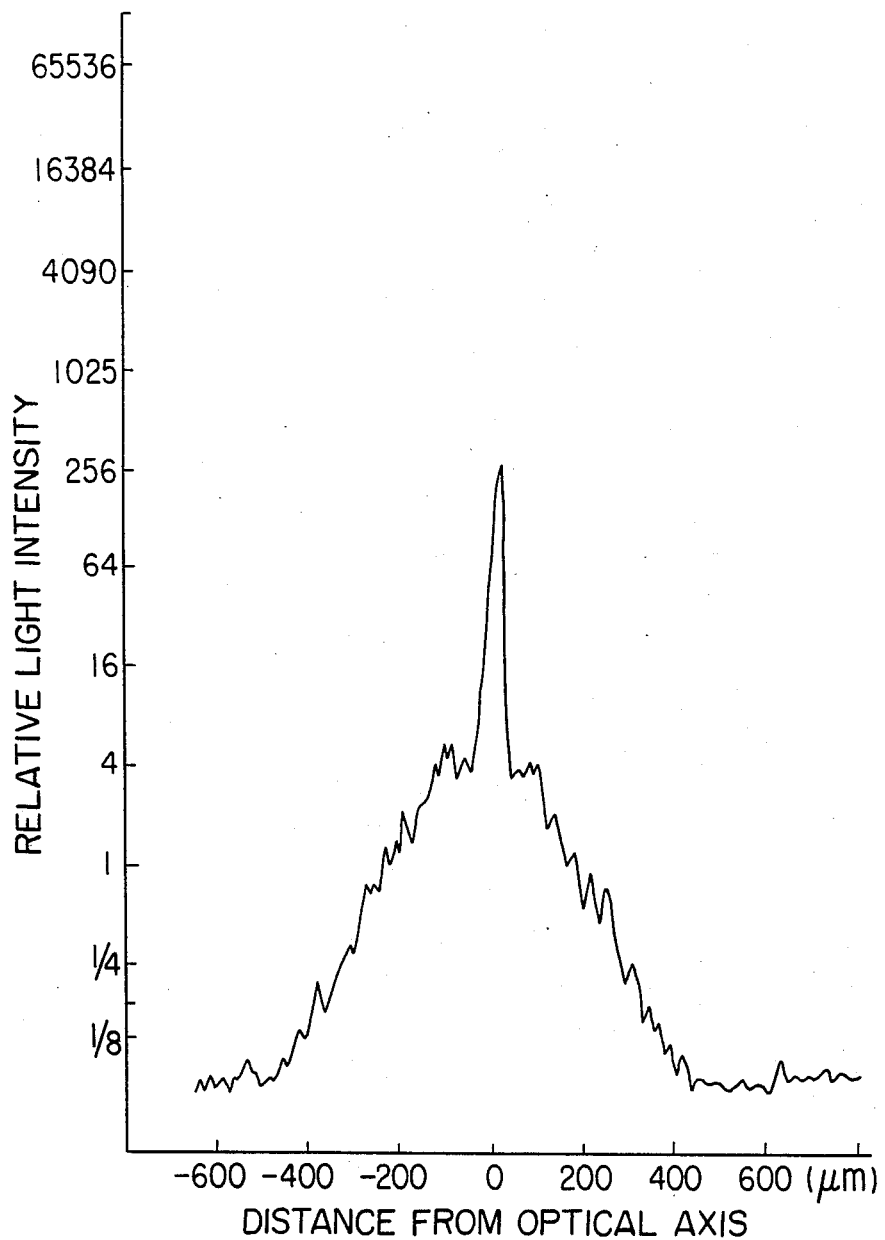
FIG. 6 is a graph similar to that in FIG. 5, wherein the phase mask is replaced with another phase mask according to the present invention.

| | |
|---|---|
| High molecular weight Compound | hydrogenated rosin ester 10 (trademark manufactured by Hercules Powder Co.), rosin ester (trademark manufactured by Hercules Powder Co.), polystyrene, polyvinyl alcohol |
| solvent | n-hexane, benzene, methyl ethyl ketone, water |
| phase mask in FIGS. 5 and 6 | resin: hydrogenated rosin ester 10 solvent: n-hexane ratio of resin: 45 wt. % |

Figure 2:
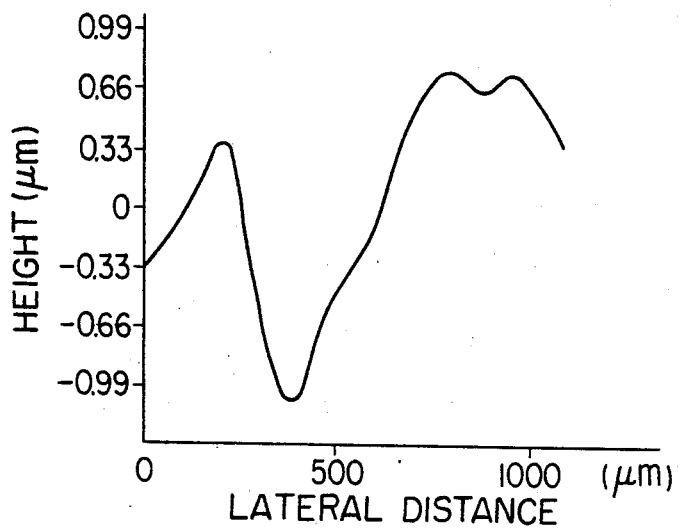
FIG. 2 is a graph illustrative of the distribution of height in the section when the phase mask shown in FIG. 1 is cut in one direction.

As will be clear from the coordinate system shown in FIG. 2 wherein the axis of abscissa represents the lateral distance ($\mu$m) and the axis of ordinate represents the height ($\mu$m), in the case of the present phase mask, fine undulations are formed at random on the surface of the transparent plate. The pitch of these undulations is different from the pitch of the frosted pattern occurring on the surface of a thermoplastic photoconductor material, but both are identical as far as the random surface undulation pattern is concerned, and it is likely that, by virtue of the surface tension of the layer of high molecular weight compound on the plate, the high-frequency ingredient thereof is pressed down by the surface tension of said layer, and as a result, the phase mask comes to hold restriction of distribution of light intensity on Fourier transform plane, i.e., spatial frequency plane.

Further, a phase mask of this type can be reproduced on mass-production basis by a replica method employing a plastic material.

Next, the characteristics of a phase mask according to the present invention will be elucidated with reference to FIGS. 3 through 6.

Figure 3:
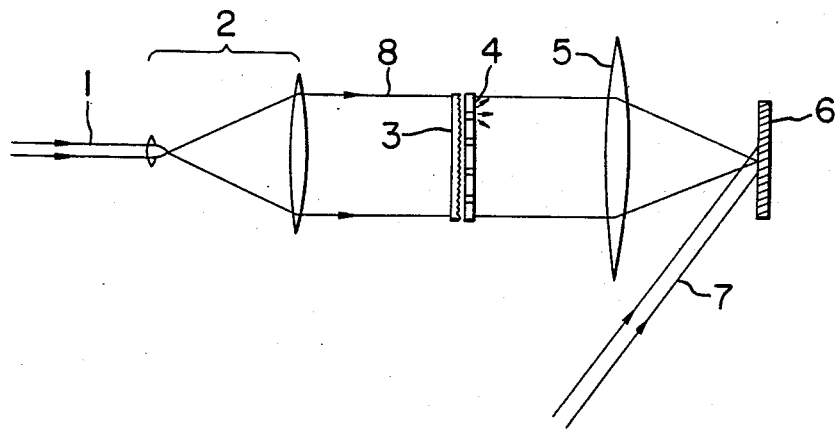
FIG. 3 is a diagrammatic representation of a holographic apparatus wherein a phase mask according to the present invention is applied.

Shown in FIG. 3 is the optical system of a holographic apparatus illustrative of the mode of application of the phase mask of the present invention, wherein the reference numeral 1 denotes the laser beam, 2 denotes the collimator lens system, 3 denotes the phase mask, 4 denotes the two-dimensional transparent object as the data mask combined with said phase mask 3, 5 denotes the Fourier transform lens, 6 denotes the hologram recording material, and 7 denotes the reference beam. The laser beam 1 enters in the lens system 2, becomes the magnified collimated beam 8, irradiates the phase mask 3 and the two-dimensional transparent object 4, is condensed by the Fourier transform lens 5 thereafter, exposes a hologram recording material disposed near the back focal plane of the Fourier transform lens 5, with the reference beam 7, and records the Fourier transform hologram.

In the foregoing mode of application of the phase mask of the present invention, the phase mask 3 is combined with the two-dimensional transparent object 4 in the following ways:
1. The mask 3 is closely attached to the two-dimensional transparent object 4.
2. The phase mask 3 is disposed at a distance in front of the two-dimensional transparent object 4. In this case, the distance between the phase mask 3 and the two-dimensional transparent object 4 is so determined as to make the light illuminating the two-dimensional transparent object 4 uniform.
3. The image of the phase mask 3 is projected on the two-dimensional transparent object 4 by the use of a collimation lens system (not shown in the drawings) efficiency of forming a Fourier transform hologram is identical with that in preceding way (1). In this case, by selecting the collimation lens system, projection of either a magnified image or a reduced image is possible.
4. The position of the phase mask 3 and that of the two-dimensional transparent object 4 in the preceding way (3) are reversed.

The above four ways may be applied by selecting a proper one according to the object-to-be-recorded. However, the preferable way of combination is (1), (3) and (4).

In this connection, on the occasion of application of the phase mask 3, a sampling mesh (not shown in the drawings) may be jointly used if more redundancy is needed.

Some examples of test in the present optical system will be given in the following.

[Test-1]

The distribution of light intensity, when a beam of 30 mm in diameter as the collimated beam 8 was focused by the use of a convex lens having a focal length of 85 mm as the Fourier transform lens 5 and said beam was focused directly through said Fourier transform lens 5 without disposing the phase mask 3 and two-dimensional transparent object 4, was measured by the photographic method (a method of photographing with a silver-halide photographic film and measuring the distribution of the light intensity on the Fourier transform plane from the degree of blackening after development).

Figure 4:
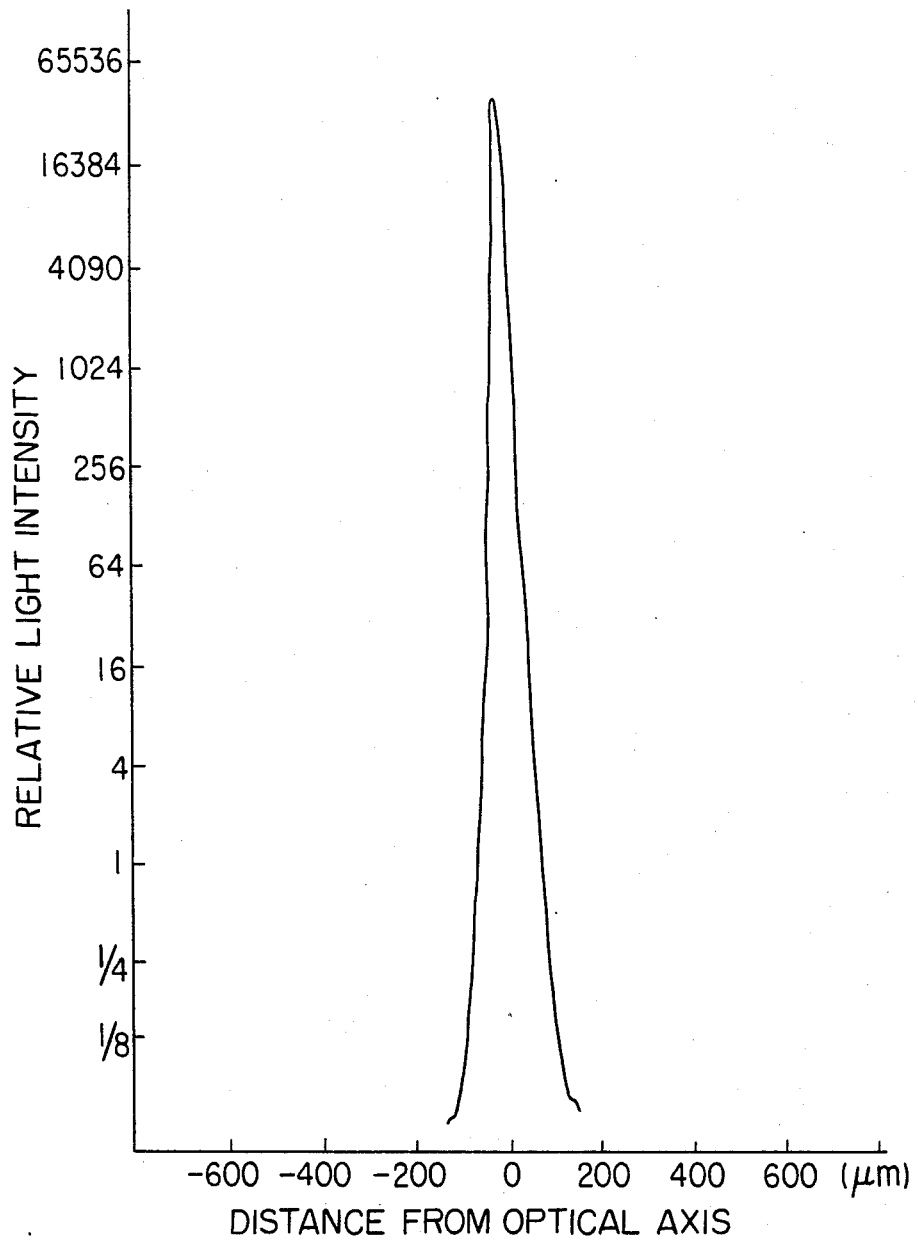
FIG. 4 is a graph illustrative of the state of distribution light intensity on a Fourier transform plane in the case where the phase mask and two-dimensional transparent object are not disposed in the holographic apparatus shown in FIG. 3.

The state of distribution of the light intensity in this case was as shown in FIG. 4.

As is clear from FIG. 4, the focusing of rays of light on the very small central part was remarkable and the peak of light intensity in the center became scores of ten thousands times as much as that in the case of a mean light intensity averaged on 1 mm of diameter. This verifies that the hitherto known hologram recording materials are incapable of linear recording.

[Test-2]

The distribution of light intensity on the hologram recording material 6 was measured in the case where the two-dimensional transparent object 4 was not disposed and only the phase mask 3 was disposed. The phase masks applied were two kinds, namely 3A and 3B. Both phase masks were identical in respect of the high molecular weight compound and solvent employed therefor excepting that the number of rotations of the spinner coating machine at the time of coating said solution of high molecular weight compound was 3000 r.p.m. as to the phase mask 3A and 1700 r.p.m. as to the other phase mask 3B, and other conditions were the same as that in Test-1.

The distribution of light intensity in the case of applying the phase mask 3A was as shown in FIG. 5, and the distribution of light intensity in the case of applying the phase mask 3B was as shown in FIG. 6.

As is clear from FIGS. 5 and 6, in both cases the peak of light intensity in the center decreased to one several hundredth compared with the peak value in the case where the phase mask 3 was not disposed as shown in FIG. 4, and the light intensity spread out within a diameter of about 1200 μm according to almost normal distribution function.

On this occasion, the light intensity at the peak in the center was still high compared with that in the surroundings thereof, but the area of this portion was very small, and the light energy was in the range of from 1/10 to 1/100 or thereabouts of the whole light energy, so that, even though it deviated from the dynamic range of hologram recording material, it proved to have little influence upon the degradation of the reconstructed image quality.

Further, as will be clear from the comparison of FIG. 5 with FIG. 6, the extent of the distribution of light intensity shown in FIG. 6 is narrower than that shown in FIG. 5. This proves that, through changing the conditions for fabrication of the phase mask, the distribution of light intensity on the Fourier transform plane can be optionally changed and the optimum phase mask can be prepared in accordance with the characteristics of hologram recording material and hologram diameter desired.

[Test-3]

A Fourier transform hologram was formed through a recording means comprising exposure, corona charging and heating. More particularly, said exposure was performed by making use of a He-Ne laser beam (wavelength: 6 328A) as the light source and a convex lens having a focal length of 150 mm as the Fourier transform lens 5, upon a thermoplastic photoconductor material as the hologram recording material 6 in the optical system shown in FIG. 3. Then said corona charging was performed upon the hologram recording material 6. Thereafter said heating was performed. Further, by the use of the phase mask 3B employed in the preceding Test-2 as the phase mask 3 and a negative original carrying transparent alphabet in an opaque background with linear width of 0.1 mm as the two-dimensional transparent object 4, a Fourier transform hologram of 1 mm in diameter was photographed.

The quality of a reconstructed image obtained from this hologram was such that the noise was minimized and the diffraction efficiency (the diffraction efficiency is shown in terms of the ratio relative to the transmitted light as the light intensity transmittance becomes almost 70% due to the absorption and reflection by the photosensitive material) was 13.5%.

In the case where the phase mask was not used, the noise of the reproduced image was remarkable and the diffraction efficiency was less than 5%.

[Test-4]

A Fourier transform hologram was photographed by employing the so-called positive original which was identical in pattern with that used in the preceding Test-3 but opaque and transparent was inverted, and applying the same ones as that in said Test-3 as to other conditions. The quality of a reconstructed image obtained from this hologram was such that the ground color was brightly reconstructed, the noise was minimized, and the diffraction efficiency was 10%.

Meanwhile, in the case where the phase mask was not used, the ground color was dark, the portion corresponding to the letters (opaque portion in original) was brightly reconstructed into an inverted image, and a faithful reconstructed image was infeasible.

Figure 7:
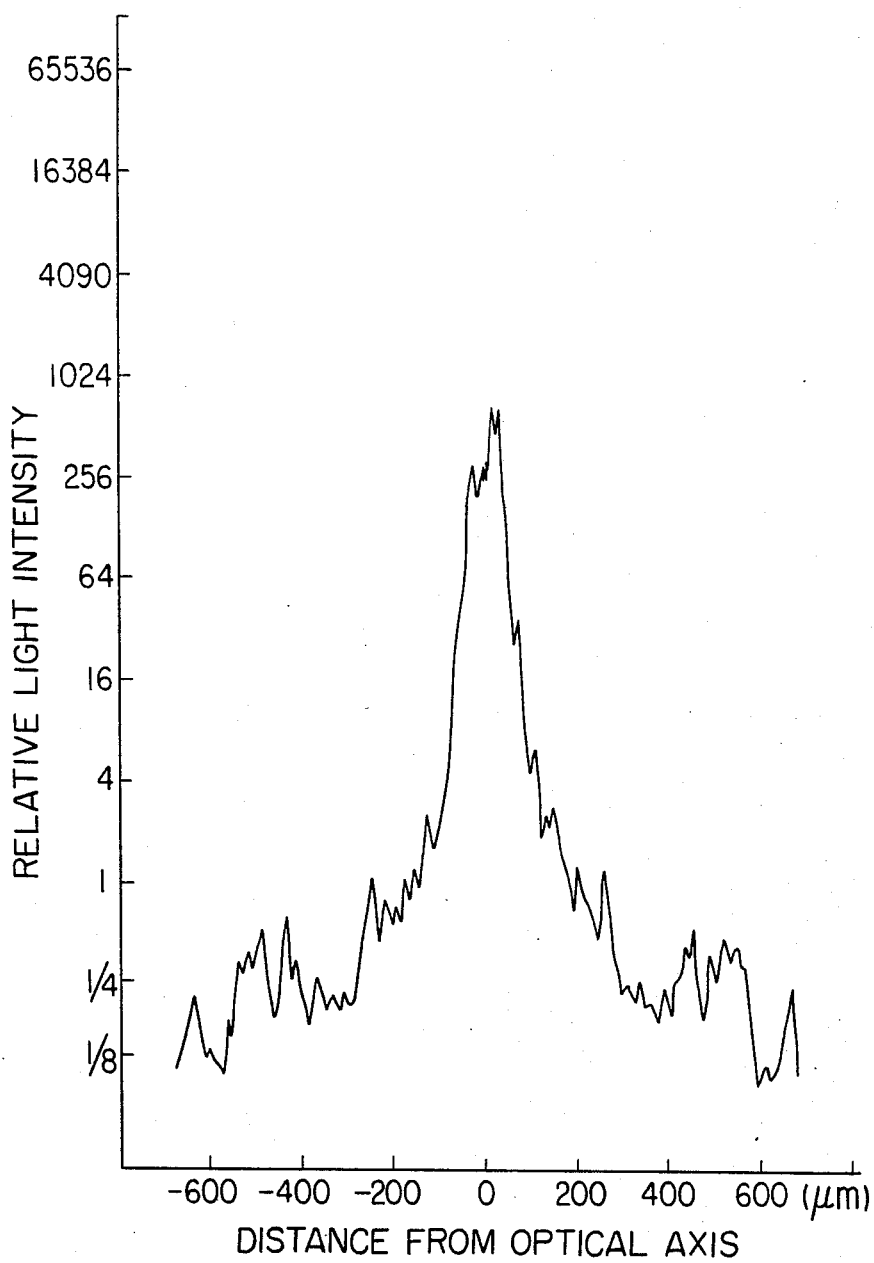
FIG. 7 is a graph illustrative of the state of distribution of light intensity on a Fourier transform plane in the case where any phase mask is not disposed and only a two-dimensional transparent object is disposed in the holographic apparatus shown in FIG. 3.
Figure 8:
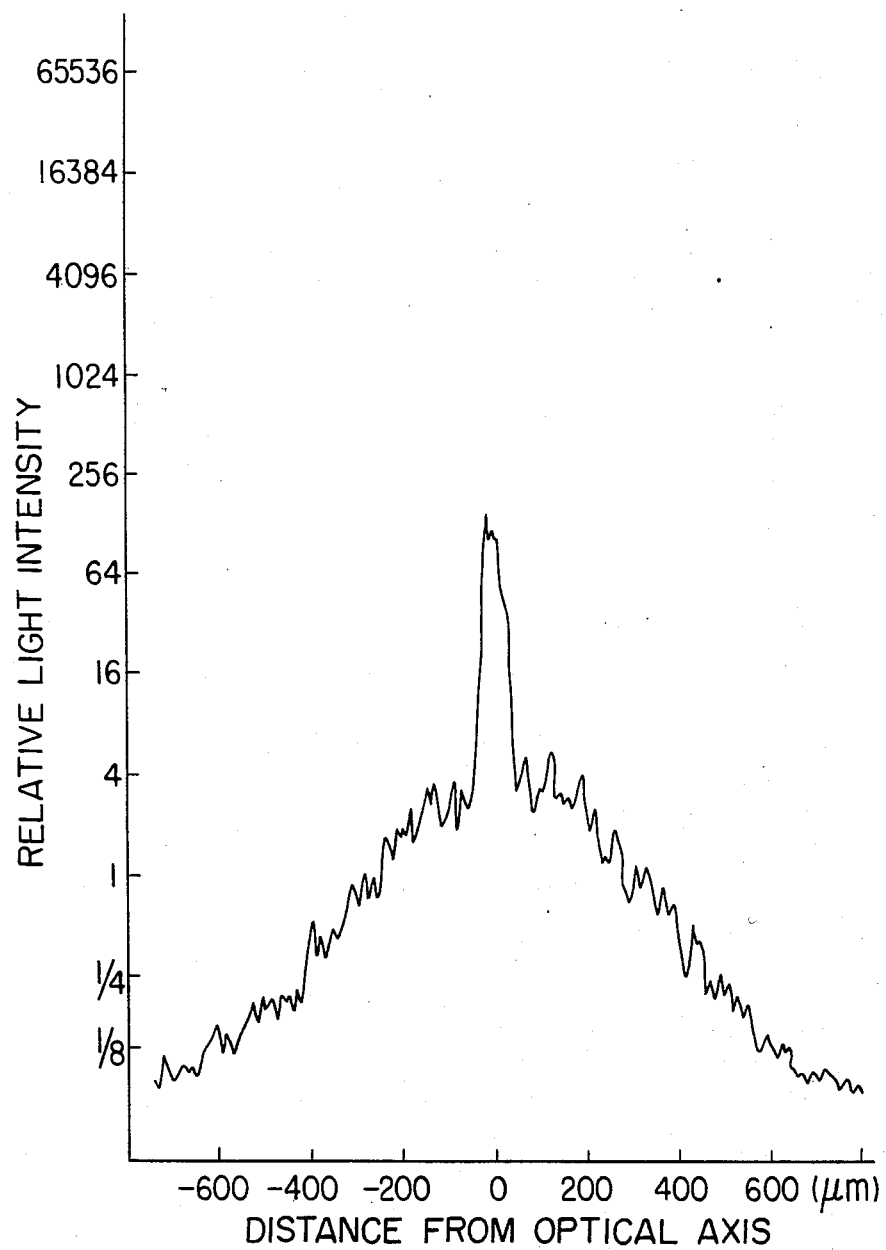
FIG. 8 is a graph illustrative of the state of distribution of light intensity on a Fourier transform plane in the case were the phase mask in FIG. 5 and the two-dimensional transparent object in FIG. 7 are combined in the holographic apparatus shown in FIG. 3.

The distribution of light intensity on the Fourier transform plane in the present test was as shown in FIGS. 7 and 8.

Shown in FIG. 7 is the distribution of light intensity in the case were the phase mask 3 was not disposed and only a positive original as the two-dimensional transparent object 4 was employed solely, and shown in FIG. 8 is the distribution of light intensity in the case were the phase mask 3 and a positive original were used jointly.

As will be clear from the comparison of FIG. 7 with FIG. 8, in the case of FIG. 7, there is observed a very intensive focusing of light in the vicinity of the optical axis, while in the case of FIG. 8, the focusing of light is very gentle and the state of distribution of light intensity is less undulating.

Although particular preferred embodiments of the invention have been disclosed hereinabove for the purpose of illustration, it will be understood that variations or modifications thereof which lie within the scope of the invention as defined by the appended claim are fully contemplated.

What is claimed is:

1. In a holographic apparatus for forming a Fourier transform hologram, the combination comprising:
   coherent light source means for producing an illuminant beam and a reference beam;
   means for producing a magnified collimated beam;
   a phase mask and a two-dimensional transparent object serving as a data mask disposed in said illuminant beam;
   optical means, including a Fourier transform lens, for producing an interference pattern between the light beam from said object and said reference beam at a Fourier transform plane defined by the focal point of said Fourier transform lens;
   a hologram recording material located near the Fourier transform plane so as to form a Fourier transform hologram thereon;
   wherein said phase mask comprises a transparent plate having a surface provided with random undulations by coating, by means of a spinner coater, with a solution of a high molecular weight compound selected from the group consisting of hydrogenated rosin ester, rosin ester, polyvinyl alcohol and polystyrene.

2. A holographic apparatus according to claim 1 in which said solution includes as the solvent for said high molecular weight compound a solvent selected from the group consisting of n-hexane, benzene, methyl ethyl ketone and water.

3. In a holographic apparatus for forming a Fourier transform hologram, the combination comprising:
   coherent light source means for producing an illuminant beam and a reference beam;
   means for producing a magnified collimated beam;
   a phase mask and a two-dimensional transparent object serving as a data mask disposed in said illuminant beam;
   optical means, including a Fourier transform lens, for producing an interference pattern between the light beam from said object and said reference beam at a Fourier transform plane defined by the focal point of said Fourier transform lens;

a hologram recording material located near the Fourier transform plane so as to form a Fourier transform hologram thereon;

wherein said phase mask comprises a transparent plate having a surface provided with random undulations by coating with a solution of a high molecular weight compound by means of a spinner coater, and wherein said solution includes a solvent selected from the group consisting of n-hexane, methyl ethyl ketone, water and benzene.

4. In a holographic apparatus for forming a Fourier transform hologram, the combination comprising:

coherent light source means for producing an illuminant beam and a reference beam;

means for producing a magnified collimated beam;

a phase mask and a two-dimensional transparent object serving as a data mask disposed in said illuminant beam;

optical means, including a Fourier transform lens, for producing an interference pattern between the light beam from said object and said reference beam at a Fourier transform plane defined by the focal point of said Fourier transform lens;

a hologram recording material located near the Fourier transform plane so as to form a Fourier transform hologram thereon;

wherein said phase mask comprises a transparent plate having a surface provided with random undulations by coating with a solution of a high molecular weight compound by means of a spinner coater.

5. A holographic apparatus according to claim 4 in which said coating solution comprises hydrogenated rosin ester dissolved in n-hexane with the proportion of said hydrogenated rosin ester being 45% by weight in the solution.

6. A holographic apparatus according to claim 4 in which said high molecular weight compound is a thermo plastic resin.

7. A holographic apparatus according to claim 4 wherein said coating is carried out by applying said coating solution to said surface of said transparent plate with the latter centered on a conventional spinner coater and the spinner coater being caused to rotate the transparent plate until the solution on the surface thereof loses its liquidity, forming fine undulations at random on the surface of said transparent plate.

8. A holographic apparatus according to claim 7 in which said rotation of said spinner coater lies in the range of about 1700 rpm to 3000 rpm.

9. A holographic apparatus according to claim 4 wherein said random undulations vary from each other in height, length and width, in shape laterally of said transparent plate, and in orientation laterally of said transparent plate.

10. A holographic apparatus according to claim 9, in which said undulations vary with respect to each other in slope and wherein the ascending and descending portions of said undulations are at least somewhat variable in slope, said undulations thereby being random in a plurality of geometric parameters and without need for precomputation of individual values for the geometric parameters of a given undulation or undulations prior to formation of said undulations on said transparent plate.

11. A holographic apparatus according to claim 10 in which the peak to valley height of said undulations is less than about 2 $\mu$m.

12. A holographic apparatus according to claim 4 in which said undulations formed on said transparent plate are sufficiently random that disposition of said phase plate in said illuminant beam substantially varies the distribution of light intensity of said illuminant beam on said Fourier transform plane as to reduce the peak light intensity in the center of such light distribution to one several hundredths of the peak value with the phase mask absent, and to spread laterally the distribution of light intensity at least about three times wider than with the phase mask absent, and wherein the proportion of light energy remaining in the center peak of the distribution pattern is only about one-tenth to one-hundredth of the total light energy of said light distribution, such that even where the intensity at said center peak still exceeds the dynamic range of the hologram recording material, it has little influence on degradation of the reconstructed image quality.

* * * * *